March 29, 1932.  V. R. MOORE ET AL  1,851,107
UDDER STEAMING DEVICE
Filed Aug. 26, 1930
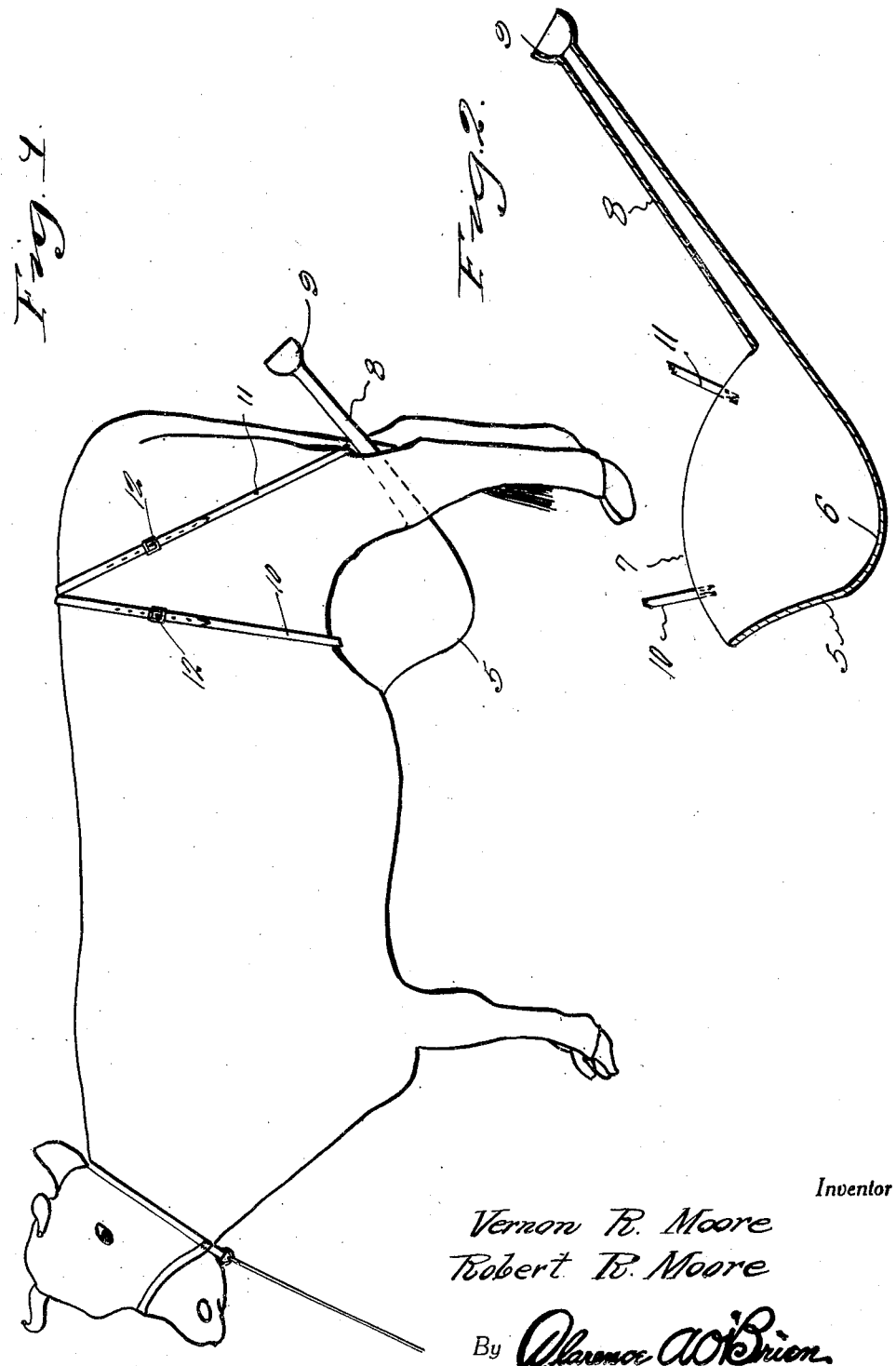
Inventor
Vernon R. Moore
Robert R. Moore
By Clarence A. O'Brien
Attorney Patented Mar. 29, 1932

1,851,107

UNITED STATES PATENT OFFICE

VERNON R. MOORE AND ROBERT R. MOORE, OF GARRISON, MINNESOTA

UDDER STEAMING DEVICE

Application filed August 26, 1930. Serial No. 477,924.

This invention relates generally to devices for steaming the udder of cows and the like animals.

It is an object of this invention to provide a bag of the class described, which is composed of flexible material formed to making close fit with the adjacent parts of the animal about the udder which bag may be strapped to the animal by means of straps of adjustable character passing over the back of the animal.

It is also an object of the invention to provide a bag of the character described having simple means in the form of a spout by which the same may be furnished with boiling water while actually applied to an animal.

These and other and further objects, the nature of the invention, its composition and combination and arrangement of parts will be apparent to any one familiar with the art to which this invention relates by consulting the following explanation of the drawings, in which:—

Figure 1 is an illustration of our complete device in position upon a cow.

Figure 2 is a vertical longitudinal section disclosing the formation of our improved steaming bag.

It is to be noted that we do not desire to limit the application of this invention to the particular embodiment set forth herein but any change or changes may be made in material and structure consistent with the spirit of the invention.

Referring in detail to the drawings, it will be seen that we provide a bag 5 of generally conical formation having a rounded bottom 6 and having its upper edges 7 curved to fit the adjacent parts of the animal when the same is in position, and formed at the rear end of the bag 5 and integral therewith is an elongated pipe 8 having at its outer end a flared portion 9 to constitute a funnel for facilitating the pouring of liquid into said spout and into the bottom of the bag 5. The bag is preferably formed of flexible resilient material which is adapted to fit snugly with the body of the animal. Straps 10 and 11 having adjusting means 12 are provided attached to the upper edge 7 of the bag 5 in each side thereof, and the straps are adapted to be crossed upon the back of the animal, and the strap which is the front strap on one side thus becomes the rear strap on the other side of the bag when in position upon the animal. The spout 8 projects rearwardly between the legs of the animal. It is obvious that the pouring of water into the spout 8 will deposit said water in the bottom 6 of the bag 5 without first coming into contact with the udder of the animal which is a very much desired provision. It is also obvious that hot water and steam will cure fever and relieve caked udders in a short time where liniment and other treatment fail. It is also obvious that at the termination of the treatment the spout 8 may be lowered to empty the contents of the bag.

What is claimed is:—

An udder steaming bag comprising a hot water containing pouch of flexible material for receiving and enclosing the udder, and having its upper edges upwardly curved to make a tight fit to the body and parts adjacent said udders without spreading the pouch, an upwardly and rearward projecting flexible pipe integrally formed on the upper rear portion of the pouch to permit filling and draining said pouch and means for suspending the pouch in position, said pipe being formed in part as a continuation of the back part of the pouch so as to permit of introducing fluid directly into the bottom of the pouch.

In testimony whereof we affix our signatures.

VERNON R. MOORE.
ROBERT R. MOORE.